United States Patent [19]

Fay

[11] 4,053,545
[45] Oct. 11, 1977

[54] PROCESS FOR MANUFACTURING LAMINATED STRUCTURAL FOAM ARTICLES

[75] Inventor: Clifford Charles Fay, St. Paul, Minn.

[73] Assignee: Standard Oil Company (Indiana), Chicago, Ill.

[21] Appl. No.: 599,984

[22] Filed: July 29, 1975

Related U.S. Application Data

[63] Continuation of Ser. No. 464,543, April 26, 1974, abandoned.

[51] Int. Cl.$^2$ .................. B29D 27/00; B32B 5/18
[52] U.S. Cl. ............................ 264/46.4; 4/187 R; 156/77; 156/309; 156/322; 264/46.8; 264/234; 264/259; 264/294; 264/DIG. 83; 428/315; 428/321
[58] Field of Search ............. 264/46.6, DIG. 83, 46.4, 264/234, 259, 294, 46.8; 156/77, 79, 309, 322; 4/166, 187 R

[56] References Cited

U.S. PATENT DOCUMENTS

| | | | |
|---|---|---|---|
| 2,313,985 | 3/1943 | Bradshaw | 264/268 |
| 2,648,370 | 8/1953 | Beach | 264/DIG. 65 |
| 3,155,753 | 11/1964 | Weissman et al. | 264/46.6 |
| 3,220,902 | 11/1965 | Edwards | 264/321 X |
| 3,238,565 | 3/1966 | Jacobs | 264/321 X |
| 3,268,636 | 8/1966 | Angell | 264/DIG. 83 |
| 3,325,332 | 6/1967 | Cleereman | 156/322 |
| 3,444,565 | 5/1969 | Anklin | 4/187 R |
| 3,526,000 | 8/1970 | Williams | 156/322 X |
| 3,577,572 | 5/1971 | Ruggles | 4/166 X |
| 3,654,062 | 4/1972 | Loew | 264/259 X |
| 3,673,617 | 7/1972 | Schulz | 4/187 R |
| 3,813,706 | 6/1974 | Williams | 4/187 R |
| 3,919,371 | 11/1975 | Jache | 264/DIG. 83 |
| 3,919,380 | 11/1975 | Smarook et al. | 264/164 |
| 3,919,382 | 11/1975 | Smarook | 264/164 |

FOREIGN PATENT DOCUMENTS

| | | | |
|---|---|---|---|
| 653,600 | 12/1962 | Canada | 264/46.6 |
| 1,212,667 | 3/1960 | France | 4/187 |
| 46-7470 | 2/1971 | Japan | 264/DIG. 83 |
| 440,684 | 7/1967 | Switzerland | 264/46.8 |
| 896,476 | 5/1962 | United Kingdom | 4/187 |
| 1,156,217 | 6/1969 | United Kingdom | |

*Primary Examiner*—Philip Anderson
*Attorney, Agent, or Firm*—Ralph C. Medhurst; Arthur G. Gilkes; William T. McClain

[57] ABSTRACT

Novel dense foam articles having a solid plastic sheet coating on at least a portion of the surface are prepared by injection molding plastic foam into a mold containing a thermoformed solid plastic sheet having the configuration of at least a part of the mold and fitted to a matching mold surface.

4 Claims, 2 Drawing Figures

PROCESS FOR MANUFACTURING LAMINATED STRUCTURAL FOAM ARTICLES

This is a continuation, of application Ser. No. 464,543, filed Apr. 26, 1974, and now abandoned.

BACKGROUND OF THE INVENTION

1. Field of the Invention

This invention relates to the molding of foamed articles having a laminated surface consisting of a solid thermoplastic sheet, such as a cast acrylic plastic sheet. The thermoplastic sheet can be a sheet having a particularly desirable smooth surface with integral coloring, or one having particular inertness to agents which would attack the underlying foam in end-use applications. Such sheet is generally more expensive than the polyethylene and polystyrene customarily employed in the injection molding of dense foam articles and such sheet in thin form, for purposes of economy, has been advantageously reinforced by techniques known to the art, for example, by an applied fiberglass-polyester backing. The composite articles of my invention, made in accordance with the described process, are a laminate of a solid thermoplastic sheet with a dense foam backing. These laminates can be used for wash basins, shower stalls, bathtubs, and the like. Such composite articles can combine the advantage of the low cost of polyethylene and polystyrene dense foam with the superior surface characteristics of acrylic sheet, or other solid thermoplastic sheet. Articles made by my technique are obtained in near-finished form and require very little final finishing operation, thus effecting a cost savings in manufacture.

2. Description of the Prior Art

The dense foam molding operation useful in the practice of my invention is suitably carried out in accordance with techniques known to the art, for example, as set forth in U.S. Pat. No. 3,268,636 — R. G. Angell. This patent discloses a process for preparing a molded foamed thermoplastic article having a high density shell and an integral lower density core. The articles produced by this process, however, have essentially the same chemical and visual characteristics throughout their cross-section, so that the high density shell will have properties very similar to that of the lower density core.

Various foamed items having surfaces prepared from different polymers from that of the core are known to the art. For example, U.S. Pat. No. 2,806,812 — E. H. Merz discloses a method for the preparation of thermoplastic sheets having a resin foam integrally bonded thereto. These sheets are made by preparing a mold assembly into which foamable resin beads are placed, after which the beads are foamed, a sheet of thermoplastic resin is applied to the top surface of the mold cavity containing the foamed beads, and atmospheric pressure is used to force the thermoplastic sheet into pressured engagement with the face of the resin foam.

Another technique of the prior art, set forth in U.S. Pat. No. 2,959,508 — D. L. Graham et al. discloses expansion into foam structure of expandable granular thermoplastic material in discrete particulate form, by mixing this material with a self-reacting exothermic substance and placing it in a mold where the exothermic material causes an expansion which fills the mold cavity. The mold cavity may be fitted with a mold form of another plastic material to prepare a composite article.

U.S. Pat. No. 3,090,078 — A. M. Stackhouse discloses a process for foaming cores of structural panels in place. Reference is made to conventional assembling procedures used for paneling systems employing a foamed resin core in which a panel is fixed by an adhesive to the foamed resin. These procedures are described as expensive and time-consuming. The new disclosure is directed to a technique for foaming or expanding a resin between a pair of skin surfaces in situ to form a standardized panel by introducing a foamable resin between panels, held in a fixed relationship, through a formulating and mixing nozzle which is made to extend the length and breadth of a particular panel and which injects a metered amount of foam-forming material as it retreats from the panel cavity. This is a free-foaming technique making use of foamable resins of the type employing water as a vapor for blowing purposes.

U.S. Pat. No. 3,124,626 — D. L. Graham et al. discloses a process for producing boat hulls of sandwich construction. In this technique, a male mold and a female mold are spaced apart from each other to form a mold cavity. Prefoamed thermoplastic expandable beads are introduced into this mold cavity as discrete particles following which a mixture of an epoxy resin curing agent is injected. A resulting chemical reaction develops exothermic heat which causes full expansion and setting of the thermoplastic beads together, with impregnation of the reinforcing material with the reacted epoxy resin.

U.S. Pat. No. 3,163,686 — R. O. Dusel et al. discloses a method for forming composite plastic devices, described as an improvement over the prior art technique of covering exposed surfaces of expanded cellular bodies with a film of plastic to form a laminated structure. The invention of this patent involves first thermoforming a thermoplastic sheet to the general outer contour of a desired article. The thin-walled receptacle thus formed is then inverted and placed within a cavity of a mold and this cavity is filled with heat-expandable polystyrene beads, following which the beads are expanded by the application of heat, so that a sandwich construction article is obtained.

Patents such as those set forth above are illustrative of the techniques employed by the prior art in the production of laminated plastic articles and are typical of the technology known to the art. I have conceived a novel and improved technique for making dense foam-supported plastic articles which may have substantially more rigid structures than can be obtained by techniques such as set forth above and substantially greater densities, with accompanying greater strength, than obtainable by the expanded particle and free-foaming techniques used in the prior art relating to plastic core or backing materials.

SUMMARY OF THE INVENTION

My invention is a process for the production of reinforced solid thermoplastic articles and the articles themselves. These can be made with a much shorter cycle time than such laminates as the acrylic and fiberglass-polyester combinations now available, while having a desirable strength, which can even surpass that of items presently made from acrylic with fiberglass-polyester backing. In the process of my invention, thermoplastic sheets having required characteristics, such as good surface finish, solvent resistance, high impact strength, and the like, are thermoformed into a desired shape and placed in a support mold adaptable to dense foam injection molding. A foamable polymer to be used as a support is injected into the mold at a normal molding temperature, or an adjusted temperature to facilitate facial melting of the thermoform, whereby the foam causes melting at the interface with the thermoform without a deleterious effect upon the surface of the thermoform next to the mold face. Bonding occurs as a result of interfacial melting which, if insufficient, can be supplemented by introduction of a temperature activated adhesive. Parts made this way can be structural foam completely surfaced with thermoplastic or structural foam having a partial surface or one flat surface of thermoplastic. These would be desirable, for example, for use as wash basins. Parts so produced can be removed from a mold with surfaces in final finish form so that, in the case of items such as a wash basin, the only further operation necessary would be drilling for plumbing attachments. Of course, molds could be designed with apertures for plumbing attachments integrally formed, although this would reduce flexibility in placing attachments on the articles made by a particular mold.

The thermoplastic sheet useful in the practice of my invention can be thermoformed in accordance with known techniques for plastics. A particularly good sheet for the practice of my invention is a cross-linked cast acrylic plastic sheet having relatively high solvent resistance. Typical of such acrylic plastic sheet is the product commercially available as Swedcast cast acrylic sheet Type 300. Typical properties for acrylic sheet useful in my process are a heat distortion temperature of 207° F. (ASTM D 648-3.6° F. min., 264 psi) and a specific heat of 0.35 BTU/lb/° F. (ASTM C351 at 77° F.)

The thermoplastic sheet useful for this process should desirably have a thickness in the range of at least 50 mil to about 125 mil, although it can be a thicker sheet, depending upon how much of this more expensive plastic, as compared to the dense foam base, one is willing to use in preparing a composite article. A 50 mil sheet is about the thinnest sheet which can be used and conveniently handled during insertion into a mold.

In practicing my invention it is important that the thermoplastic sheet, or thermoform, as I have called it herein, in the form of the finished article be pre-heated before introduction of the dense foam into the mold. The amount of pre-heating will vary depending upon the linear expansion of a particular material, but the amount of heating, that is, the temperature to which the thermoform should be brought before dense foam is introduced to a mold, should be sufficient that the linear shrinkage of the thermoform will be substantially the same as the linear shrinkage of the dense foam core material as the composite cools to room temperature. If these linear shrinkages are not matched, the final article will be stressed and possibly warped. Although warping can be reduced or eliminated by increasing the thickness of the dense foam core, this is wasteful of material and makes the final article more expensive than it would otherwise be, while increasing mold cycle time by reason of the larger amount of plastic which must be cooled to room temperature.

The dense foam used as a backing material or core material for thermoformed sheet in accordance with my invention can be any injection moldable thermoplastic foamable material. For economy, polyethylene and polystyrene structural foams are particularly useful in the practice of my invention. These foams can contain various fillers, additives, and stabilizers known to the art and the foam itself can be made from an unfoamed composition containing any of various nucleating agents and blowing agents well known to the art. I consider it desirable to use a normally gaseous blowing agent such as nitrogen, from the standpoint of economics and safety. A technique of dense foam molding is disclosed in U.S. Pat. No. 3,268,636 — Angell and U.S. Pat. No. 3,436,446 — Angell. Specifics as to the operations to be followed in preparing the polymer which forms the dense foam core or backup material for a thermoformed acrylic sheet are set forth in those patents. The drawing of U.S. Pat. No. 3,268,636 shows a simplified diagram of a dense foam molding device.

FIG. 1 is a perspective view where a laminated wash basin is illustrated as one embodiment of my invention. The surface of this basin is made of a thermoformed cast acrylic plastic sheet having a marbleized coloration and designated 11. This sheet has a thickness of approximately 80 mil. The core or support of the basin, 12, is a dense foam polystyrene, molded in place against the thermoformed sheet and, in the illustration, having a thickness of about 375 mil.

FIG. 2 is a cross sectional view taken along lines 2—2 of the basin of FIG. 1. An adhesive may be applied to the thermoformed sheet prior to introduction into the mold in order to increase the strength of the bond between the sheet and the support. The interface where adhesive is applied is shown by 13 in FIG. 2.

DESCRIPTION OF THE PREFERRED EMBODIMENT

Figure 1:
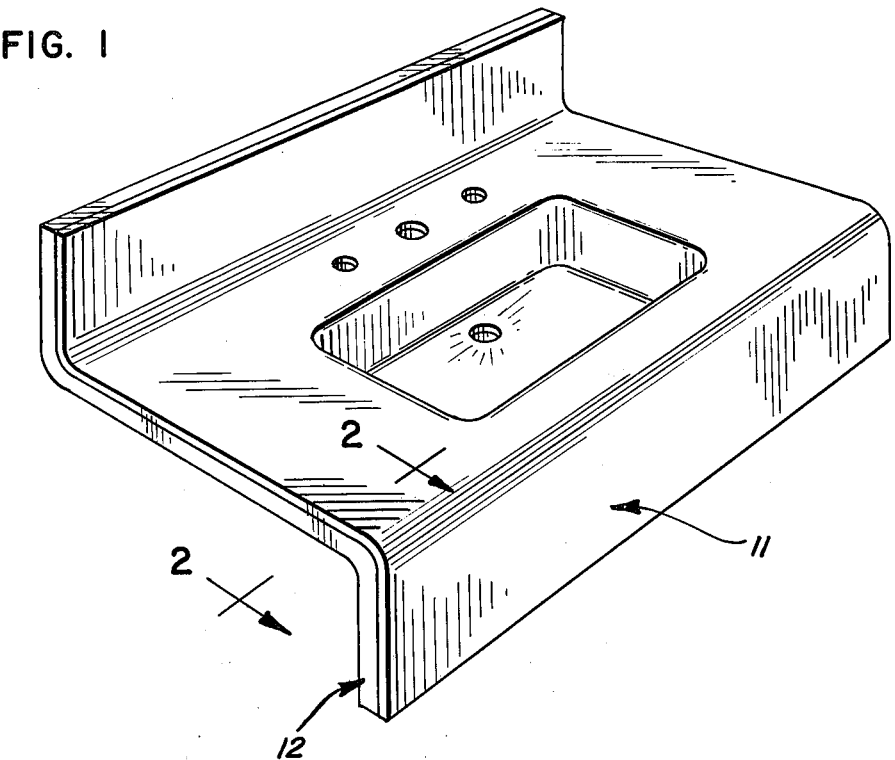
Figure 2:
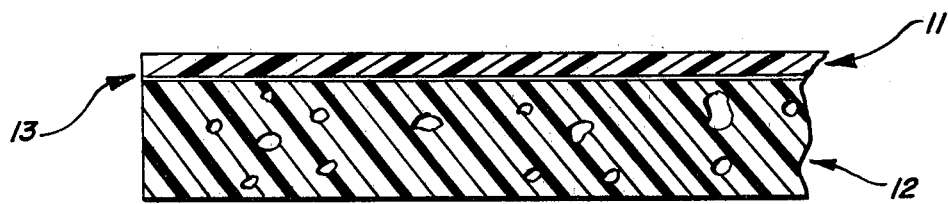

A structural foam article having an acrylic surface may be prepared in accordance with the following example.

A cast acrylic sheet having a thickness of 80 mil is thermoformed into a basin, of the bathroom hand-washing basin type, by a conventional thermoforming technique. The article so thermoformed is heated to 50° to 60° C. and placed inside a supporting mold affixed to a dense foam injection molding machine. The charge for this machine comprises a "crystal" polystyrene containing nitrogen as a foaming agent. The admixture of gas and polymer is injected into the mold containing the acrylic plastic thermoform at a temperature of about 160° to 170° C. The mold is cooled to about 50°-60° C. before removal of the composite item to avoid warping. The laminate which results is allowed to cool and there is obtained an acrylic plastic coated basin having a very smooth outer surface with a dense foam polystyrene core heat-bonded to that outer surface.

In the event that heat bonding does not provide an adequately strong bond for all purposes for which an article is intended, a coating of an adhesive may be applied to the thermoform comprising the skin of the final article so as to more firmly bond the sheet to the dense foam core. Suitable adhesives are the contact cements used for adhering plastic sheets to wood backings. The adhesive may also be of the heat-activated type to reduce handling problems.

A specific suitable adhesive is the acrylic prepolymer, known in the art as a 'B' stage acrylic which will set upon reaction caused by the heat of the foam plastic injected in my process. Also suitable are thermoset adhesives of the epoxy type, familiar to the art in the form of glues which initially flow upon heating and then set.

Additional modifications and variations involving the inventive concept set forth herein will be apparent to those of skill in the art.

What I claim as my invention is:

1. A process for preparing a laminated article comprising a thermoplastic sheet bonded to and supported by a thermoplastic foam which comprises: introducing by injection a foamable thermoplastic resin composition into a mold containing a thermoplastic sheet preheated to a first temperature, said thermoplastic sheet having substantially the contours of at least a portion of a surface of said mold and being fitted to said portion of a surface of said mold, said foamable thermoplastic resin being at a second temperature such that said foamable thermoplastic resin composition foams in said mold and a thermal bond at the interface is created between the resulting thermoplastic foam and said thermoplastic sheet by facial melting of said thermoplastic sheet caused by said foam, wherein said first and second temperatures are selected such as to result in substantially the same linear shrinkage of said thermoplastic foam and said thermoplastic sheet upon cooling the resultant laminate to room temperature.

2. A process for preparing a laminated article comprising a thermoplastic sheet bonded to and supported by a thermoplastic foam which comprises: introducing by injection a foamable thermoplastic resin composition into a mold containing a thermoplastic sheet preheated to a first temperature, said sheet being provided with a coating of a heat activated adhesive on at least a portion of a first surface and said sheet having a second surface to be contacted with said foamable thermoplastic resin composition opposite said first surface with substantially the contours of at least a portion of a surface of said mold and having said second surface fitted to said portion of a surface of said mold, said foamable thermoplastic resin being at a second temperature such that said foamable thermoplastic resin composition foams in said mold and a bond is created between the resulting thermoplastic foam and said thermoplastic sheet upon reaction of said adhesive caused by the heat of said foamable thermoplastic resin composition, said first and second temperatures being selected so as to result in substantially the same linear shrinkage of said thermoplastic sheet and said thermoplastic foam upon cooling the resultant laminate to room temperature.

3. The process of claim 1 wherein, said first temperature is 50°–60° C, said second temperature is 160°–170° C, said thermoplastic sheet is a cast acrylic sheet of about 80 mils and said foamable thermoplastic is polystyrene containing a foaming agent.

4. A process for preparing a laminated article comprising a thermoplastic sheet bonded to and supported by a thermoplastic foam which comprises: introducing by injection a foamable thermoplastic resin composition into a mold containing a thermoplastic sheet preheated to a first temperature, said thermoplastic sheet having substantially the contours of at least a portion of a surface of said mold and being fitted to said portion of a surface of said mold, said foamable thermoplastic resin being at a second temperature such that said foamable thermoplastic resin composition foams in said mold and a thermal bond at the interface is created between the resulting thermoplastic foam and said thermoplastic sheet by facial melting of said thermoplastic sheet caused by said foam, wherein said first and second temperatures are selected such as to result in substantially the same linear shrinkage of said thermoplastic foam and said thermoplastic sheet upon cooling the resultant laminate to room temperature, wherein said first temperature is 50°–60° C, said second temperature is 160°–170° C, said thermoplastic sheet is a cast acrylic sheet of about 80 mils and said foamable thermoplastic is polystyrene containing a foaming agent.

* * * * *

UNITED STATES PATENT OFFICE
CERTIFICATE OF CORRECTION

Patent No. 4,053,545            Dated October 11, 1977

Inventor(s)            Clifford C. Fay

It is certified that error appears in the above-identified patent and that said Letters Patent are hereby corrected as shown below:

Claim 2 should read as follows:

2. A process for preparing a laminated article comprising a thermoplastic sheet bonded to and supported by a thermoplastic foam which comprises: introducing by injection a foamable thermoplastic resin composition into a mold containing a thermoplastic sheet preheated to a first temperature, said sheet being provided with a coating of a heat activated adhesive on at least a portion of a first surface to be contacted with said foamable thermoplastic resin composition and said sheet having a second surface opposite said first surface with substantially the contours of at least a portion of a surface of said mold and having said second surface fitted to said portion of a surface of said mold, said

UNITED STATES PATENT OFFICE
CERTIFICATE OF CORRECTION

Patent No. 4,053,545          Dated October 11, 1977

Inventor(s) Clifford C. Fay

It is certified that error appears in the above-identified patent and that said Letters Patent are hereby corrected as shown below:

foamable thermoplastic resin being at a second temperature such that said foamable thermoplastic resin composition foams in said mold and a bond is created between the resulting thermoplastic foam and said thermoplastic sheet upon reaction of said adhesive caused by the heat of said foamable thermoplastic resin composition, said first and second temperatures being selected so as to result in substantially the same linear shrinkage of said thermoplastic sheet and said thermoplastic foam upon cooling the resultant laminate to room temperature.

Signed and Sealed this

Twenty-first Day of November 1978

[SEAL]

Attest:

RUTH C. MASON
Attesting Officer

DONALD W. BANNER
Commissioner of Patents and Trademarks